United States Patent
Chiu et al.

(10) Patent No.: US 10,642,328 B2
(45) Date of Patent: May 5, 2020

(54) SOLID STATE DRIVE WITH RESET CIRCUIT AND RESET METHOD THEREOF

(71) Applicants: Lite-On Electronics (Guangzhou) Limited, Guangzhou (CN); LITE-ON TECHNOLOGY CORPORATION, Taipei (TW)

(72) Inventors: I-Hsiang Chiu, Taipei (TW); Shih-Hung Hsieh, Taipei (TW)

(73) Assignee: SOLID STATE STORAGE TECHNOLOGY CORPORATION, Taipei (TW)

( * ) Notice: Subject to any disclaimer, the term of this patent is extended or adjusted under 35 U.S.C. 154(b) by 16 days.

(21) Appl. No.: 15/831,745

(22) Filed: Dec. 5, 2017

(65) Prior Publication Data

US 2019/0113957 A1   Apr. 18, 2019

(30) Foreign Application Priority Data

Oct. 12, 2017  (CN) .......................... 2017 1 0948855

(51) Int. Cl.
*G06F 1/24* (2006.01)
*G06F 13/40* (2006.01)
(Continued)

(52) U.S. Cl.
CPC .............. *G06F 1/24* (2013.01); *G06F 3/0601* (2013.01); *G06F 13/102* (2013.01);
(Continued)

(58) Field of Classification Search
None
See application file for complete search history.

(56) References Cited

U.S. PATENT DOCUMENTS

| 6,134,656 A | * | 10/2000 | LaBerge | G06F 1/24 |
| | | | | 710/108 |
| 2005/0251617 A1 | * | 11/2005 | Sinclair | G06F 3/061 |
| | | | | 711/103 |

(Continued)

FOREIGN PATENT DOCUMENTS

| TW | 201112130 | 4/2011 |
| TW | 201532069 | 8/2015 |
| TW | 1528156 | 4/2016 |

OTHER PUBLICATIONS

Christensson, P. (Sep. 23, 2014). GPIO Definition. <https://techterms.com/definition/gpio>. (Year: 2014).*

(Continued)

*Primary Examiner* — Charles Rones
*Assistant Examiner* — Hewy H Li
(74) *Attorney, Agent, or Firm* — WPAT, PC

(57) ABSTRACT

A solid state drive with a reset circuit includes a controlling circuit, a flash array and a buffer. The controlling circuit includes a physical layer circuit and a first input/output port. The first input/output port is connected with a first reset terminal of a host. The flash array and the buffer are connected with the controlling circuit. When the first reset terminal of the host activates a reset signal, a voltage level of the first input/output port is changed. After a delay time, the voltage level of a second reset terminal of the physical layer circuit is changed and the physical layer circuit is reset.

9 Claims, 3 Drawing Sheets

(51) Int. Cl.
*G06F 13/16* (2006.01)
*G06F 13/10* (2006.01)
*G06F 13/20* (2006.01)
*G06F 13/42* (2006.01)
*G06F 3/06* (2006.01)

(52) U.S. Cl.
CPC .......... *G06F 13/1673* (2013.01); *G06F 13/20* (2013.01); *G06F 13/4063* (2013.01); *G06F 13/4072* (2013.01); *G06F 13/4295* (2013.01); *G06F 2213/0026* (2013.01)

(56) References Cited

U.S. PATENT DOCUMENTS

| | | | |
|---|---|---|---|
| 2010/0237913 A1* | 9/2010 | Nishioka | G06F 1/24 327/143 |
| 2014/0195718 A1* | 7/2014 | Abraham | G06F 9/00 711/103 |

OTHER PUBLICATIONS

Taiwan Intellectual Property Office, Office Action:, dated Sep. 13, 2018.

* cited by examiner

SOLID STATE DRIVE WITH RESET CIRCUIT AND RESET METHOD THEREOF This application claims the benefit of People's Republic of China Patent Application No. 201710948855.0, filed Oct. 12, 2017, the subject matter of which is incorporated herein by reference.

FIELD OF THE INVENTION

The present invention relates to a solid state drive, and more particularly to a solid state drive with a reset circuit and a reset method thereof.

BACKGROUND OF THE INVENTION

As known, the internal buses of the computer system in the early stage include an advanced graphic port (AGP) bus and a peripheral component Interconnect (PCI) bus. The AGP bus is connected with a graphic card. The PCI bus is connected with a peripheral device such as an internet card.

Since the data transmission speed of a PCI Express (PCIe) bus is fast, the conventional AGP bus and the conventional PCI bus are replaced by the PCIe bus. In other words, the internal devices of the computer system are all connected with the PCIe buses.

For example, the graphic card and the solid state drive (SSD) of the existing computer system are connected with the PCIe buses.

FIG. 1 is a schematic block diagram illustrating the connection between a solid state drive and a host of a conventional computer system. The solid state drive 100 is connected with the host 130 through a PCIe bus 120.

Moreover, the solid state drive 100 comprises a controlling circuit 110 and a flash array 105. The controlling circuit 110 is connected with the flash array 105.

The controlling circuit 110 comprises a PCIe physical layer circuit 112, which is also referred as a PCIe PHY circuit. The host 130 comprises a PCIe physical layer circuit 132. The PCIe physical layer circuit 112 of the controlling circuit 110 and the PCIe physical layer circuit 132 of the host 130 are connected with each other through the PCIe bus 120.

Consequently, the host 130 may issue an access command to the controlling circuit 110 of the solid state drive 100 through the PCIe bus 120. For example, according to a write command, a write data from the host 130 is stored into the flash array 105 under control of the controlling circuit 110. Alternatively, according to a read command, a read data is read from the flash array 105 and transmitted to the host 130 under control of the controlling circuit 110.

According to the specifications of the PCIe bus 120, one of plural control signals from the PCIe bus 120 is a reset signal. As shown in FIG. 1, the PCIe physical layer circuit 132 of the host 130 has a reset terminal RESET1# to activate the reset signal. Moreover, the reset terminal RESET1# of the PCIe physical layer circuit 132 of the host 130 is connected with a reset terminal RESET2# of the PCIe physical layer circuit 112 of the controlling circuit 110 through a physical wire. Consequently, the PCIe physical layer circuit 132 of the host 130 can activate the reset signal through the reset terminal RESET1# at any time and directly reset the PCIe physical layer circuit 112 of the controlling circuit 110.

According to the specifications of the PCIe bus 120, the reset signal of the PCIe bus 120 has the highest priority to be processed. That is, when the reset terminal RESET2# of the PCIe physical layer circuit 112 of the controlling circuit 110 receives the reset signal, the PCIe physical layer circuit 112 of the controlling circuit 110 has to be reset immediately. Generally, the PCIe physical layer circuit 132 of the host 130 can activate the reset signal at any time. If the host 130 activates the reset signal while the PCIe physical layer circuit 112 of the controlling circuit 110 is executing the access command, the PCIe physical layer circuit 112 of the controlling circuit 110 is reset compulsively. Consequently, the data that is being processed by the controlling circuit 110 is possibly suffered from corruption. Under this circumstance, the solid state drive 100 is suffered from unrecoverable injury.

SUMMARY OF THE INVENTION

An embodiment of the present invention provides a solid state drive with a reset circuit. The solid state drive is connected with a host through a bus. The host has a first reset terminal. The solid state drive includes a controlling circuit, a flash array and a buffer. The controlling circuit includes a physical layer circuit and a first input/output port corresponding to the bus. The physical layer circuit has a second reset terminal. The first reset terminal of the host is connected with the first input/output port. The physical layer circuit is reset according to a level state of the second reset terminal. The flash array is connected with the controlling circuit. The buffer is connected with the controlling circuit. When the first reset terminal of the host activates a reset signal, a voltage level of the first input/output port is changed from a first level to a second level. After a delay time, the voltage level of the second reset terminal of the physical layer circuit is changed from a third level to a fourth level and the physical layer circuit is reset.

Another embodiment of the present invention provides a reset method for a solid state drive with a reset circuit. The solid state drive is connected with a host through a bus. The host has a first reset terminal. The solid state drive includes a control circuit. The control circuit includes a physical layer circuit and a first input/output port corresponding to the bus. The physical layer circuit has a second reset terminal. Firstly, the controlling circuit judges whether a voltage level of the first input/output port is changed from a first level to a second level. The first input/output port is connected with the first reset terminal of the host. Then, a voltage level of the second reset terminal of the physical layer circuit is changed from a third level to a fourth level after the voltage level of the first input/output port has been changed to the second level for a delay time. Then, the physical layer circuit is reset. If the controlling circuit judges that the voltage level of the first input/output port is changed to the second level, the controlling circuit stops receiving a command from the host temporarily and a data that is being processed by the physical layer circuit is stored in a buffer of the solid state drive temporarily.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
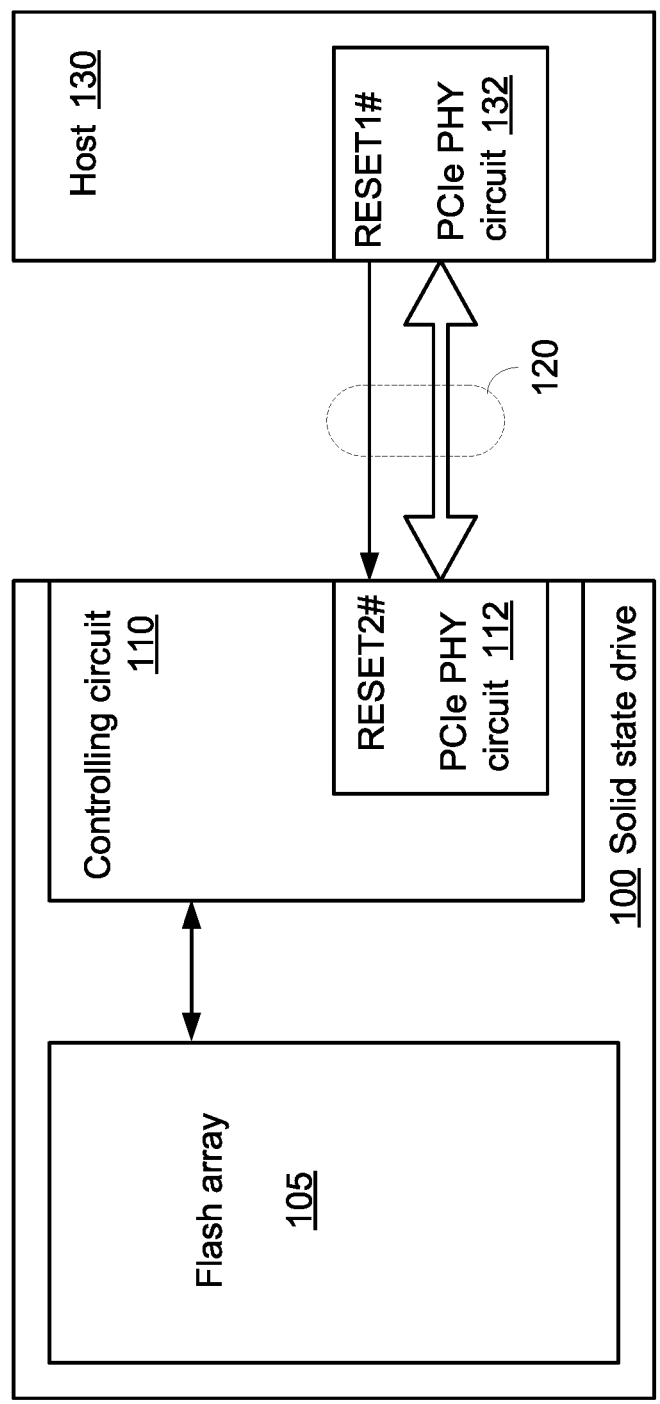
FIG. 1 (prior art) is a schematic block diagram illustrating the connection between a solid state drive and a host of a conventional computer system.
Figure 2A:
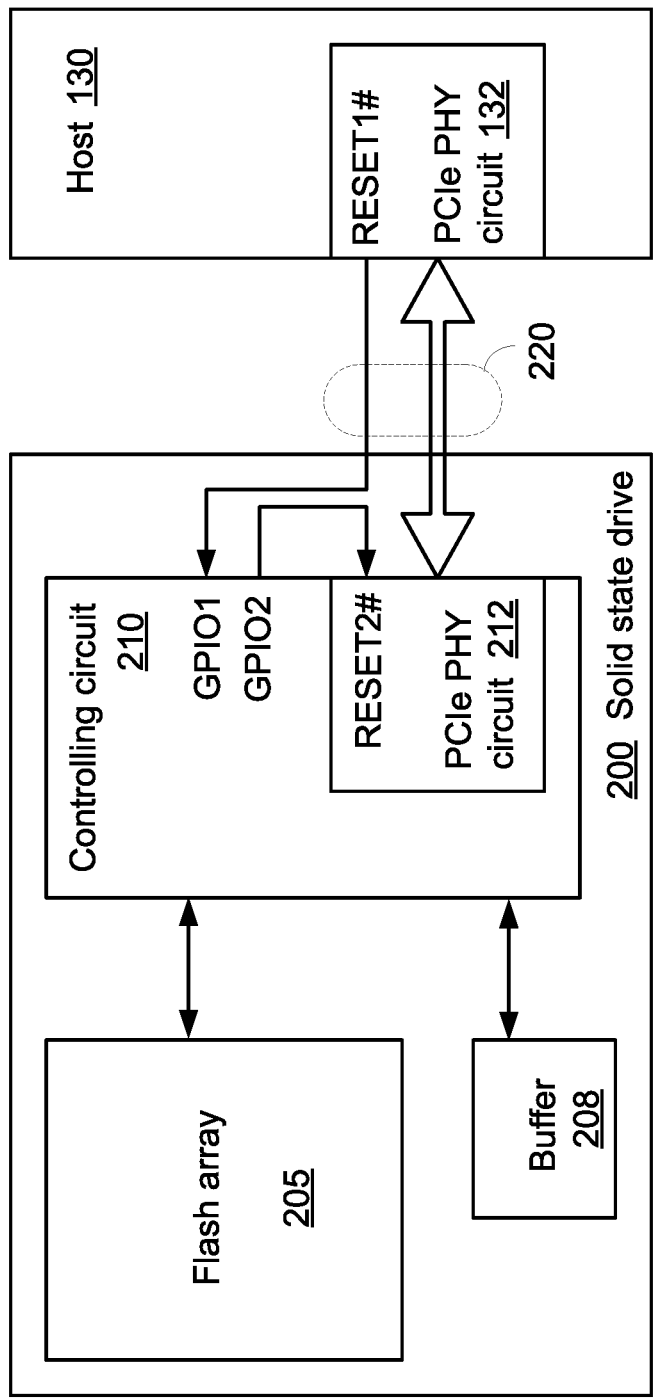
FIG. 2A is a schematic block diagram illustrating the connection between a solid state drive and a host of a computer system according to a first embodiment of the present invention.
Figure 2B:
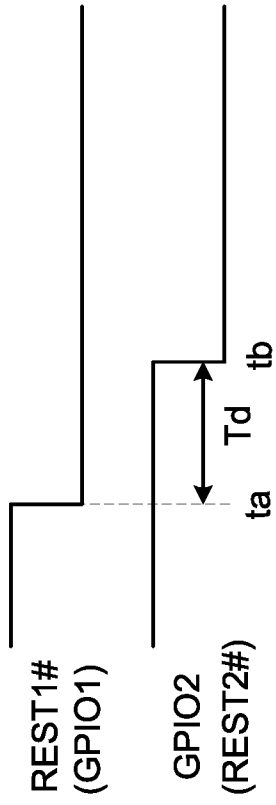
FIG. 2B is a schematic timing waveform diagram illustrating associated signals of the computer system as shown in FIG. 2A.

FIG. 2A is a schematic block diagram illustrating the connection between a solid state drive and a host of a computer system according to a first embodiment of the present invention. FIG. 2B is a schematic timing waveform diagram illustrating associated signals of the computer system as shown in FIG. 2A. In the computer system, a host 130 issues an access command to a solid state drive 200 through a PCIe bus 220. The operating principles of the computer system are not redundantly described herein. The structure of the host 130 is similar to that of FIG. 1.

The solid state drive 200 comprises a controlling circuit 210, a flash array 205 and a buffer 208. The controlling circuit 210 is connected with the flash array 205 and the buffer 208. For example, the buffer 208 is a dynamic random access memory (DRAM).

The controlling circuit 210 comprises a PCIe physical layer circuit 212, which is also referred as a PCIe PHY circuit. The PCIe physical layer circuit 212 has a reset terminal RESET2#. Moreover, the controlling circuit 210 further comprises two I/O ports. For example, the two I/O ports are general purpose I/O ports GPIO1 and GPIO2.

In this embodiment, the general purpose I/O port GPIO1 of the controlling circuit 210 is directly connected with the reset terminal RESET1# of the PCIe physical layer circuit 132 of the host 130 through a physical wire. The general purpose I/O port GPIO1 of the controlling circuit 210 and the reset terminal RESET1# of the PCIe physical layer circuit 132 of the host 130 have the same voltage level. The general purpose I/O port GPIO2 of the controlling circuit 210 is directly connected with the reset terminal RESET2# of the PCIe physical layer circuit 212 of the controlling circuit 210. The general purpose I/O port GPIO2 of the controlling circuit 210 and the reset terminal RESET2# of the PCIe physical layer circuit 212 have the same voltage levels.

While the host 130 performs an ordinary operation on the solid state drive 200 such as a data accessing operation, the general purpose I/O port GPIO1 of the controlling circuit 210 and the reset terminal RESET1# of the PCIe physical layer circuit 132 of the host 130 have the same voltage level (e.g., a first level). In addition, the general purpose I/O port GPIO2 of the controlling circuit 210 and the reset terminal RESET2# of the PCIe physical layer circuit 212 of the controlling circuit 210 have the same voltage level (e.g., a second level). The first level and the second level are identical or different.

When the PCIe physical layer circuit 132 of the host 130 activates the reset signal through the reset terminal RESET1#, the voltage level at the general purpose I/O port GPIO1 of the controlling circuit 210 is changed to a third level. The third level is different from the first level. After a delay time, the voltage level at the reset terminal RESET2# of the PCIe physical layer circuit 212 of the controlling circuit 210 is changed to a fourth level. The fourth level is different from the second level.

In an embodiment, the first level and the second level are voltage levels in a high level state. An implementation example of the present invention will be described as follows.

When the host 130 intends to reset the PCIe physical layer circuit 212 of the controlling circuit 210, the PCIe physical layer circuit 132 of the host 130 activates the reset signal through the reset terminal RESET1#. That is, the reset terminal RESET1# of the PCIe physical layer circuit 132 of the host 130 is switched from the high level state (e.g., the first level) to the low level state (e.g., the third level). Consequently, the general purpose I/O port GPIO1 of the controlling circuit 210 is switched from the high level state (e.g., the first level) to the low level state (e.g., the third level). According to the level state of the general purpose I/O port GPIO1, the controlling circuit 210 judges whether the reset signal is received.

After a delay time, the controlling circuit 210 activates a control signal of the general purpose I/O port GPIO2. That is, after the delay time, the general purpose I/O port GPIO2 is switched from the high level state (e.g., the second level) to the low level state (e.g., the fourth level). Consequently, the reset terminal RESET2# of the PCIe physical layer circuit 212 of the controlling circuit 210 is switched from the high level state (e.g., the second level) to the low level state (e.g., the fourth level). According to the level state of the reset terminal RESET2#, the controlling circuit 210 resets the PCIe physical layer circuit 212 of the controlling circuit 210 according to the level state of the reset terminal RESET2#.

When the general purpose I/O port GPIO1 of the controlling circuit 210 receives the reset signal and the general purpose I/O port GPIO1 of the controlling circuit 210 is switched from the high level state (e.g., the first level) to the low level state (e.g., the third level), the controlling circuit 210 performs a data protecting operation. For example, the controlling circuit 210 stops receiving the command from the host 130 temporarily. In addition, the data that is being processed by the PCIe physical layer circuit 212 is temporarily stored in the buffer 208 by the controlling circuit 210. As mentioned above, the controlling circuit 210 detects the level state of the general purpose I/O port GPIO1 to judge if whether the reset signal is received and accordingly to perform the data protecting operation.

Please refer to FIG. 2B. At the time point ta, the host 130 intends to reset the PCIe physical layer circuit 212 of the controlling circuit 210. Before the time point ta, the host 130 performs the ordinary operation on the solid state drive 200. That is, before the time point ta, the reset terminal RESET1# of the PCIe physical layer circuit 132 of the host 130 and the general purpose I/O port GPIO2 of the controlling circuit 210 are in the high level state. In other words, the general purpose I/O port GPIO1 of the controlling circuit 210 and the reset terminal RESET2# of the PCIe physical layer circuit 212 of the controlling circuit 210 are also in the high level state.

At the time point ta, the host 130 activates the reset signal through the reset terminal RESET1#. That is, at the time point ta, the reset terminal RESET1# of the PCIe physical layer circuit 132 of the host 130 is switched from the high level state to the low level state. Since the general purpose I/O port GPIO1 of the controlling circuit 210 is connected with the reset terminal RESET1#, the general purpose I/O port GPIO1 is also switched from the high level state to the low level state. According to the level state of the general purpose I/O port GPIO1, the controlling circuit 210 judges whether the reset signal is received. When the controlling circuit 210 confirms that the reset signal is received, the controlling circuit 210 performs the data protecting operation.

After a delay time Td (i.e., at the time point tb), the general purpose I/O port GPIO2 is switched from the high level state to the low level state under control of the controlling circuit 210. Since the reset terminal RESET2# of the PCIe physical layer circuit 212 of the controlling circuit 210 is connected with the general purpose I/O port GPIO2, the reset terminal RESET2# of the PCIe physical layer circuit 212 of the controlling circuit 210 is also switched from the high level state to the low level state. And, the PCIe physical layer circuit 212 of the controlling circuit 210 is reset according to the level state of the reset terminal RESET2#.

The controlling circuit 210 performs the data protecting operation during the delay time Td. For example, during the delay time Td, the controlling circuit 210 stops receiving the command from the host 130 temporarily. In addition, the data that is being processed by the PCIe physical layer circuit 212 is temporarily stored in the buffer 208 by the controlling circuit 210. After the PCIe physical layer circuit 212 is reset and operated again, the PCIe physical layer circuit 212 retrieves the processed data from the buffer 208 and continuously processes the data. Consequently, the data corruption problem of the solid state drive 200 can be effectively overcome.

Figure 3:
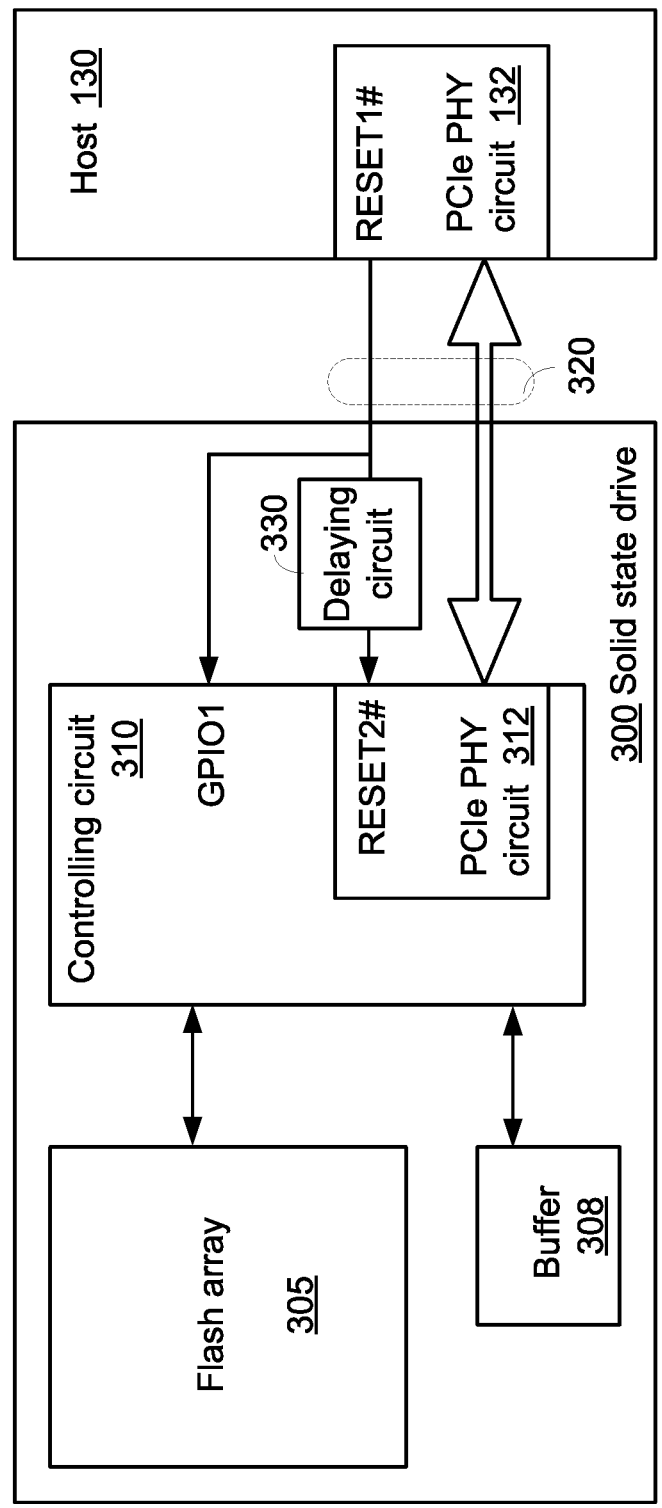
FIG. 3 is a schematic block diagram illustrating the connection between a solid state drive and a host of a computer system according to a second embodiment of the present invention.

FIG. 3 is a schematic block diagram illustrating the connection between a solid state drive and a host of a computer system according to a second embodiment of the present invention. In the computer system, a host 130 issues an access command to a solid state drive 300 through a PCIe bus 320. The operating principles of the computer system are not redundantly described herein. The structure of the host 130 is similar to that of FIG. 1.

The solid state drive 300 comprises a controlling circuit 310, a flash array 305, a buffer 308 and a delaying circuit 330. The controlling circuit 310 is connected with the flash array 305 and the buffer 308. For example, the buffer 308 is a dynamic random access memory (DRAM).

The controlling circuit 310 comprises a PCIe physical layer circuit 312. The PCIe physical layer circuit 312 has a reset terminal RESET2#. Moreover, the controlling circuit 310 further comprises an I/O port such as a general purpose I/O port GPIO1.

In this embodiment, the general purpose I/O port GPIO1 of the controlling circuit 310 is directly connected with the reset terminal RESET1# of the PCIe physical layer circuit 132 of the host 130 through a physical wire. Moreover, the delaying circuit 330 is connected with the reset terminal RESET2# of the PCIe physical layer circuit 312 of the controlling circuit 310 and the reset terminal RESET1# of the PCIe physical layer circuit 132 of the host 130.

While the host 130 performs an ordinary operation on the solid state drive 300 such as a data accessing operation, the general purpose I/O port GPIO1 of the controlling circuit 310 and the reset terminal RESET1# of the PCIe physical layer circuit 132 of the host 130 have the same voltage level (e.g., a first level). In addition, the reset terminal RESET2# of the PCIe physical layer circuit 312 of the controlling circuit 310 has a second level. The first level and the second level are identical or different Similarly, when the PCIe physical layer circuit 132 of the host 130 activates the reset signal through the reset terminal RESET1#, the voltage level at the general purpose I/O port GPIO1 of the controlling circuit 310 is changed to a third level. The third level is different from the first level. After a delay time, the voltage level at the reset terminal RESET2# of the PCIe physical layer circuit 312 of the controlling circuit 310 is changed to a fourth level. The fourth level is different from the second level.

In an embodiment, the first level and the second level are voltage levels in a high level state. An implementation example of the present invention will be described as follows.

When the host 130 intends to reset the PCIe physical layer circuit 312 of the controlling circuit 310, the PCIe physical layer circuit 132 of the host 130 activates the reset signal through the reset terminal RESET1#. That is, the reset terminal RESET1# of the PCIe physical layer circuit 132 of the host 130 is switched from the high level state (e.g., the first level) to the low level state (e.g., the third level). Consequently, the general purpose I/O port GPIO1 of the controlling circuit 310 is switched from the high level state (e.g., the first level) to the low level state (e.g., the third level). When the controlling circuit 310 confirms that the reset signal is received according to the level state of the general purpose I/O port GPIO1, the controlling circuit 310 performs a data protecting operation.

When the PCIe physical layer circuit 132 of the host 130 activates the reset signal through the reset terminal RESET1#, the delaying circuit 330 also receives the reset signal. After the delaying circuit 330 provides a delay time, the reset terminal RESET2# of the PCIe physical layer circuit 312 of the controlling circuit 310 is switched from the high level state (e.g., the second level) to the low level state (e.g., the fourth level). And, the PCIe physical layer circuit 312 of the controlling circuit 310 is reset according to level state of the reset terminal RESET2#. In this embodiment, after the delaying circuit 330 provides the delay time, the delaying circuit 330 issues a signal to switch the level state of the reset terminal RESET2# of the PCIe physical layer circuit 312 of the controlling circuit 310.

Similarly, when the general purpose I/O port GPIO1 of the controlling circuit 310 receives the reset signal and the general purpose I/O port GPIO1 of the controlling circuit 310 is switched from the high level state (e.g., the first level) to the low level state (e.g., the third level), the controlling circuit 310 performs the data protecting operation. For example, the controlling circuit 310 stops receiving the command from the host 130 temporarily. In addition, the data that is being processed by the PCIe physical layer circuit 312 is temporarily stored in the buffer 308 by the controlling circuit 310.

During the delay time, the controlling circuit 310 performs the data protecting operation. After the PCIe physical layer circuit 312 is reset and operated again, the PCIe physical layer circuit 312 retrieves the processed data from the buffer 308 and continuously processes the data. Consequently, the data corruption problem of the solid state drive 300 can be effectively overcome.

According to the specifications of the PCIe bus, the voltage level at the reset terminal RESET1# of the PCIe physical layer circuit 132 of the host 130 needs to be changed for at least a specified time period Ta when the reset signal is activated. For example, the time period Ta is 100 μs. In an embodiment, the delay time is set as Ta/2, i.e., 50 μs. Consequently, in case that the clock signal is operated at an operation speed of 500 MHz, the controlling circuit 310 has the sufficient time to perform the data protecting operation. Under this circumstance, the processed data can be safely stored in the buffer before the PCIe physical layer circuit 312 of the controlling circuit 310 being reset.

After the voltage level at the reset terminal RESET1# of the PCIe physical layer circuit 132 of the host 130 has been changed for the specified time period Ta, the voltage level at the reset terminal RESET1# is restored to the original voltage level corresponding to the ordinary operation. Moreover, the voltage level at the reset terminal RESET2# of the PCIe physical layer circuit 212 (or 312) of the controlling circuit 210 (or 310) is also restored to the original voltage level corresponding to the ordinary operation.

From the above descriptions, the present invention provides a solid state device with a reset circuit and a reset method. When the host intends to reset the physical layer circuit, the controlling circuit of the solid state drive judges whether the reset signal is received according to the level state of the I/O port. When the controlling circuit confirms that the reset signal is received, the controlling circuit performs the data protecting operation. After a delay time, the level state at the reset terminal of the physical layer circuit of the controlling circuit is changed. Consequently, the physical layer circuit is reset. In such way, the data corruption problem of the solid state drive can be effectively overcome. Moreover, the timing of changing the voltage level of the reset terminal of the physical layer circuit of the controlling circuit can be controlled by the controlling circuit or determined by the delaying circuit.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A solid state drive with a reset circuit, the solid state drive being connected with a host through a bus, the host having a first reset terminal, the solid state drive comprising:
   a controlling circuit comprising a physical layer circuit corresponding to the bus, wherein the physical layer circuit has a second reset terminal, and the physical layer circuit is reset according to a level state of the second reset terminal, wherein the controlling circuit further comprises a first input/output port, and the first reset terminal of the host is connected with the first input/output port;
   a flash array connected with the controlling circuit; and
   a buffer connected with the controlling circuit,
   wherein the controlling circuit further comprises a second input/output port, and the second input/output port is directly connected with the second reset terminal of the physical layer circuit, and the second input/output port and the second reset terminal of the physical layer circuit have the same voltage levels,
   wherein when the first reset terminal of the host activates a reset signal in order to reset the physical layer circuit, a voltage level of the first input/output port is changed from a first level to a second level, wherein after a delay time, the voltage level of the second reset terminal of the physical layer circuit is changed from a third level to a fourth level and the physical layer circuit is reset.

2. The solid state drive as claimed in claim 1, wherein after the delay time, the voltage level of the second reset terminal of the physical layer circuit is changed from the third level to the fourth level through the second input/output port under control of the controlling circuit.

3. The solid state drive as claimed in claim 2, wherein the first input/output port is a first general purpose input/output port, and the second input/output port is a second general purpose input/output port.

4. The solid state drive as claimed in claim 1, wherein the bus is a PCIe bus, and the physical layer circuit is a PCIe physical layer circuit.

5. The solid state drive as claimed in claim 1, wherein if the controlling circuit judges that the voltage level of the first input/output port is changed to the second level, the controlling circuit performs a data protecting operation.

6. The solid state drive as claimed in claim 5, wherein while the data protecting operation is performed, the controlling circuit stops receiving a command from the host temporarily and a data that is being processed by the physical layer circuit is stored in the buffer.

7. The solid state drive as claimed in claim 1, wherein the controlling circuit judges whether the reset signal is received according to the voltage level of the first input/output port.

8. A reset method for a solid state drive, the solid state drive being connected with a host through a bus, the solid state drive comprising a control circuit, the control circuit comprising a physical layer circuit corresponding to the bus, the physical layer circuit having a second reset terminal, the controlling circuit further comprising a first input/output port and a second input/output port each being independent of the physical layer circuit, the reset method comprising steps of:
   judging whether a voltage level of the first input/output port is changed from a first level to a second level;
   changing a voltage level of the second input/output port from a third level to a fourth level after the voltage level of the first input/output port has been changed to the second level for a delay time, wherein the second input/output port is directly connected with the second reset terminal of the physical layer circuit, and the second input/output port and the second reset terminal of the physical layer circuit have the same voltage levels; and
   resetting the physical layer circuit according to the change of the second reset terminal,
   wherein if the controlling circuit judges that the voltage level of the first input/output port is changed to the second level, the controlling circuit stops receiving a command from the host temporarily and a data that is being processed by the physical layer circuit is stored in a buffer of the solid state drive temporarily.

9. The reset method as claimed in claim 8, wherein the bus is a PCIe bus, and the physical layer circuit is a PCIe physical layer circuit.

* * * * *